United States Patent [19]

Anderson

[11] 4,189,279
[45] Feb. 19, 1980

[54] APPARATUS AND METHOD FOR BURNISHING GEARS

[76] Inventor: Marvin R. Anderson, 17 Deepland South, Grosse Pointe Shores, Mich. 48236

[21] Appl. No.: 850,439

[22] Filed: Nov. 10, 1977

Related U.S. Application Data

[62] Division of Ser. No. 758,983, Jan. 13, 1977, Pat. No. 4,080,699.

[51] Int. Cl.² .............................................. B65G 47/34
[52] U.S. Cl. ...................... 414/750; 29/90 B; 198/655; 198/859; 414/751; 409/6
[58] Field of Search ............ 214/1 BB; 198/486, 816, 198/859, 645, 646, 649, 652, 655; 29/90 R, 90 B, 159.2; 72/88, 90; 90/1; 414/750, 751, 753

[56] References Cited

U.S. PATENT DOCUMENTS

| | | | |
|---|---|---|---|
| 1,883,007 | 10/1932 | Sheel | 198/645 X |
| 2,736,238 | 2/1956 | Moncrieff | 90/1 |
| 2,910,919 | 11/1959 | Rye | 10/162 R X |
| 3,084,572 | 4/1963 | Starck | 72/88 |
| 3,354,782 | 11/1967 | Buchanan et al. | 198/859 X |
| 3,722,661 | 3/1973 | Williams | 198/859 X |
| 3,793,866 | 2/1974 | Anderson et al. | 72/88 |

FOREIGN PATENT DOCUMENTS

626767 7/1949 United Kingdom ..................... 198/859

Primary Examiner—L. J. Paperner
Attorney, Agent, or Firm—Reising, Ethington, Barnard, Perry & Brooks

[57] ABSTRACT

Apparatus and a method for burnishing gears incorporating a pair of gear racks having opposed forming faces with teeth spaced therealong for meshing with a toothed gear received therebetween to provide the sole support for the gear as it is rotated by rack movement while the rack teeth burnish the gear teeth. A loader is positioned on one lateral side of the gear racks and includes a movable gripper mechanism that positions the gears to be burnished between the racks for meshing engagement therewith as the racks are driven by a reciprocal drive mechanism of the apparatus. Grippers of the gripper mechanism grip the gears during loading and have pushers that push the burnished gears to a delivery guide on the opposite lateral side of the gear racks from the loader. A movable guide member of the guide is fixed to one of the gear racks and receives the burnished gears to feed the gears to a stationary guide member as a pusher fixed to the other gear rack moves the burnished gears during reciprocal driving of the gear racks. A conveyor for feeding the loader includes gear carriers supported by a continuous chain trained over a pair of spaced sprockets. One of the sprockets is adjustably supported by a chain tensioner while the other sprocket is driven by a cylinder and indexing arm through a one-way clutch in order to move the chain and the gears carried by the carriers on the chain.

7 Claims, 12 Drawing Figures

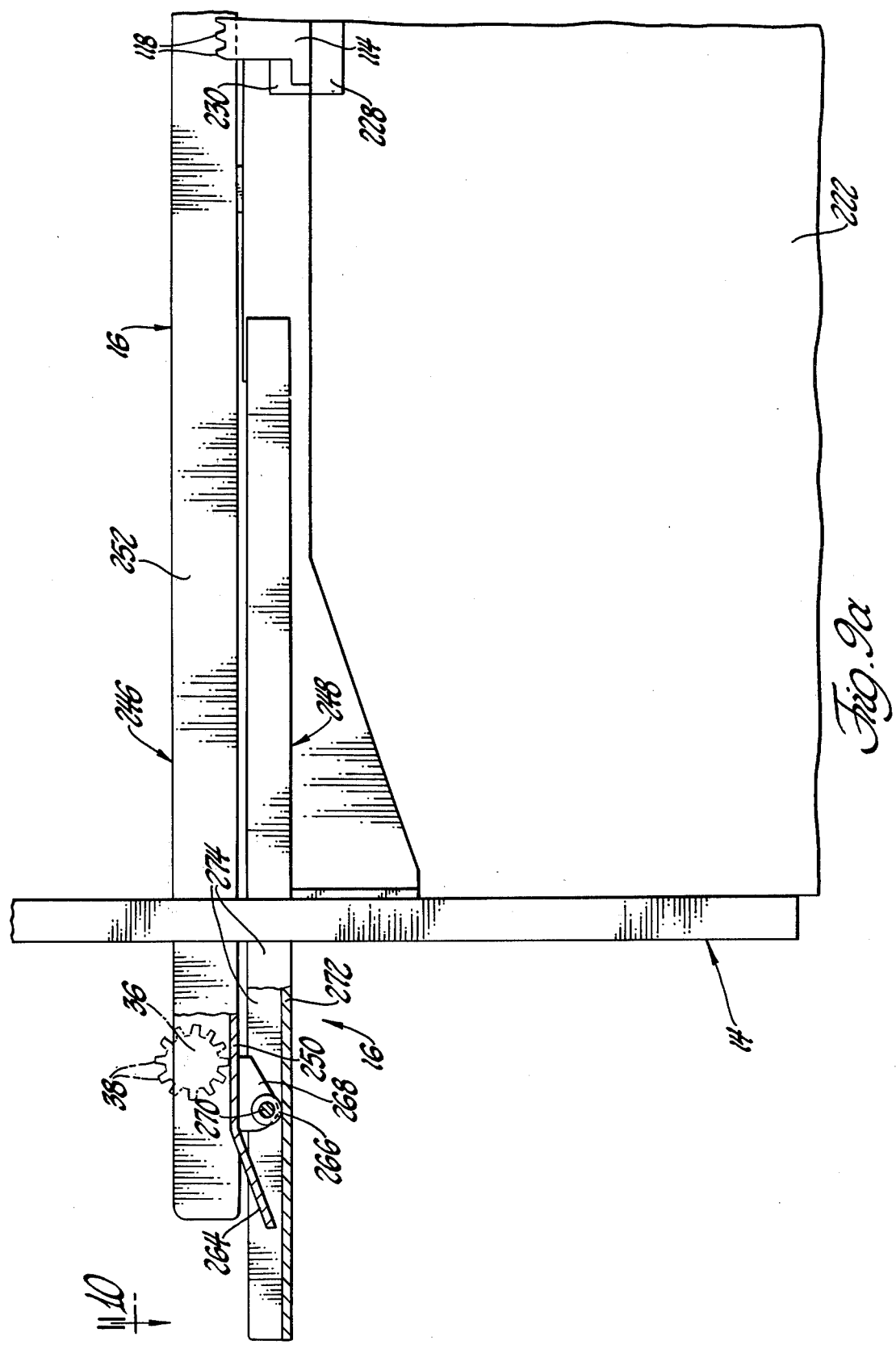

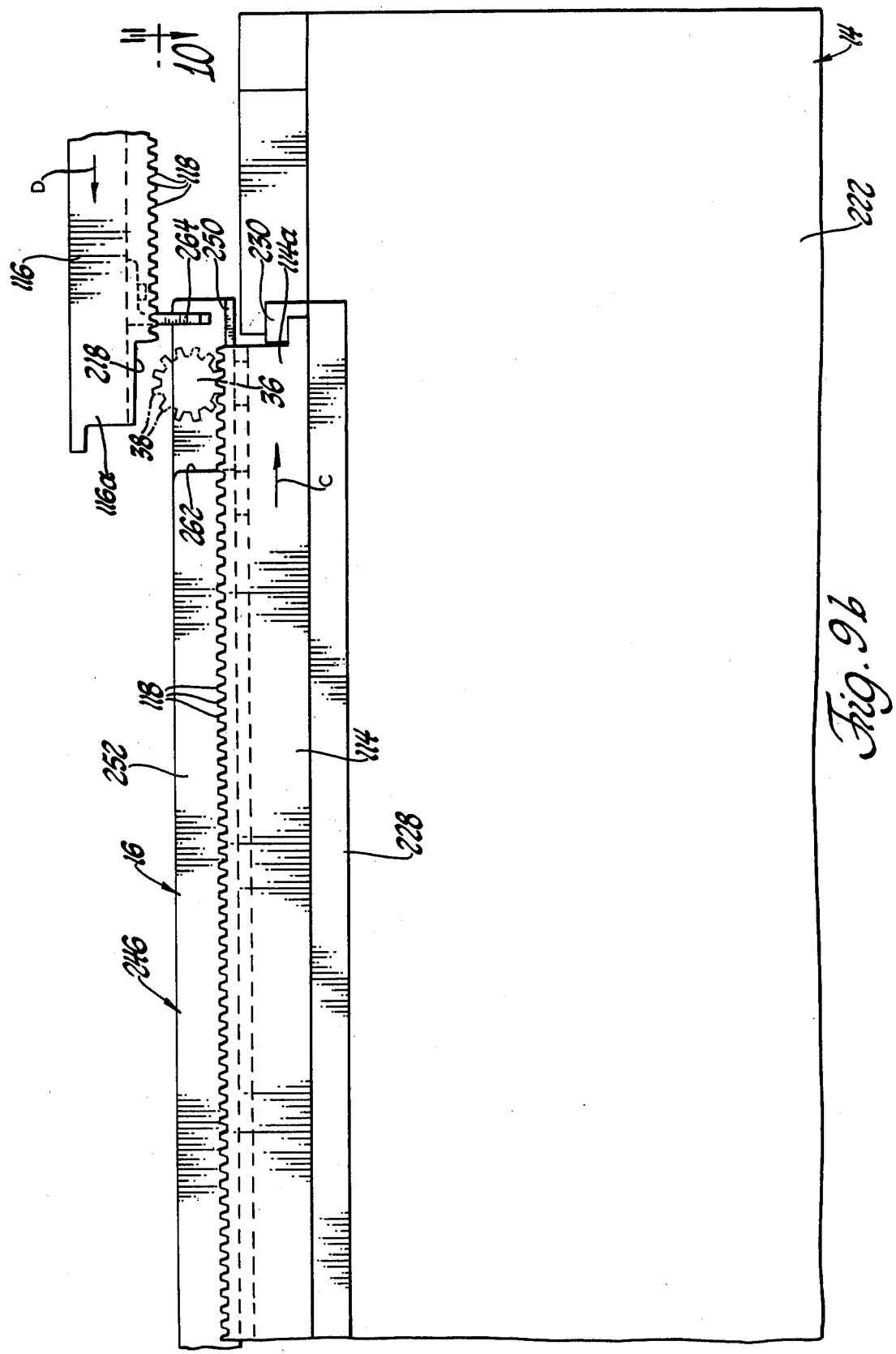

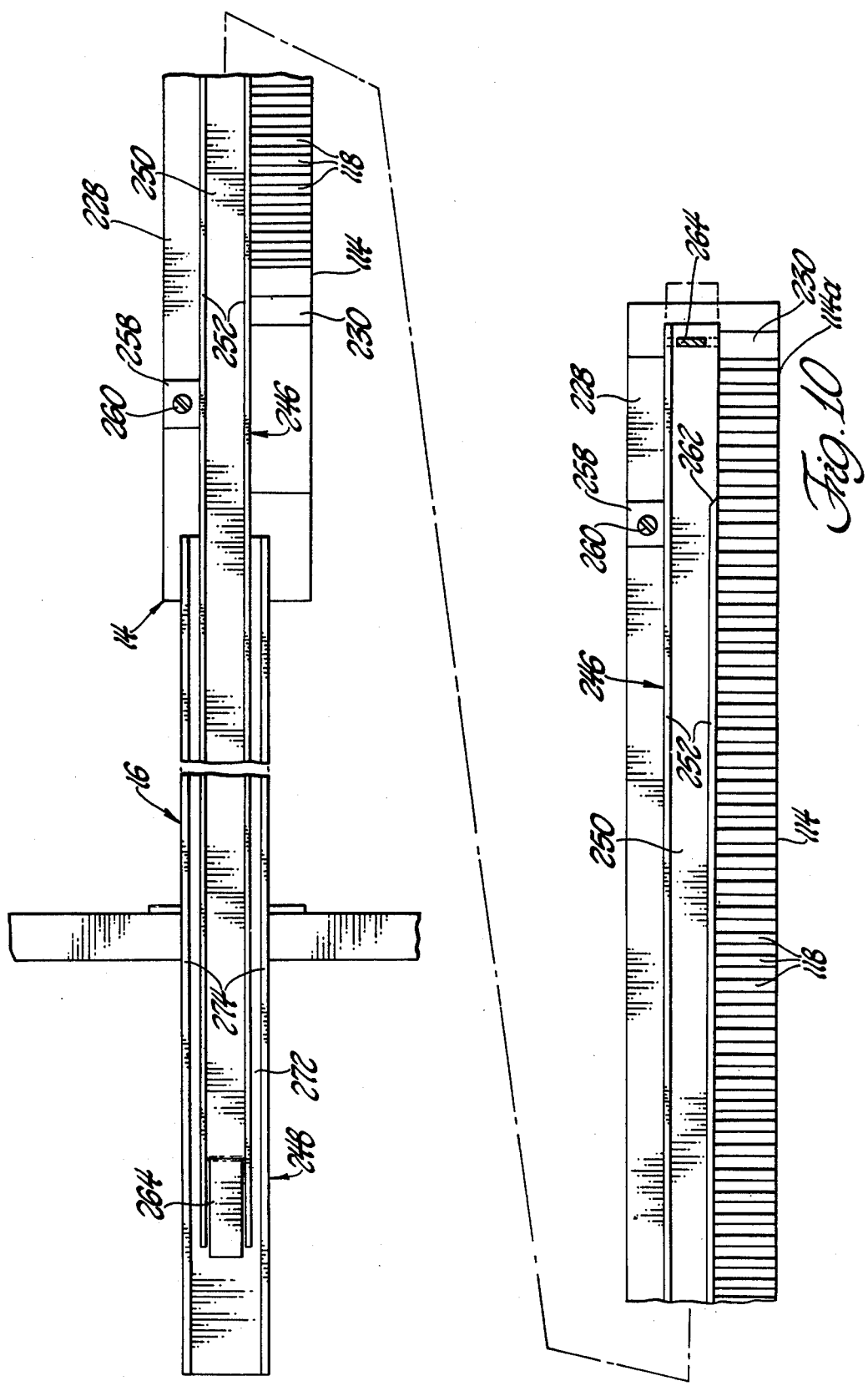

APPARATUS AND METHOD FOR BURNISHING GEARS

This is a division of application Ser. No. 758,983 filed Jan. 13, 1977, now U.S. Pat. No. 4,080,699.

BACKGROUND OF THE INVENTION

1. Field of the Invention

This invention relates to apparatus and a method for burnishing toothed gears to remove surface defects from the gear teeth.

2. Description of the Prior Art

Conventional gear burnishing machines include toothed rotary tools supported in a spaced relationship to each other to receive a toothed gear that is rotatably supported on a pair of work spindles about an axis parallel to the axes about which the tools rotate. Driving of one or more of the tools meshes the tool teeth with the gear teeth so that pressure applied therebetween causes the harder teeth of the tools to remove surface defects from the softer gear teeth. Removal of the surface defects on the burnished gears lengthens their useful lifetime and also mitigates gear noise during use.

In order to have high production capacity, burnishing machines must include suitable mechanism for loading and unloading the gears. The work spindles that rotatably support the gears during the burnishing are conventionally supported for movement so as to perform the loading and unloading of the gears. Automatic conveyors have also been utilized to feed gear burnishing machines and receive burnished gears therefrom after being operated on by the machines.

Conventional apparatus like that described above is disclosed by U.S. Pat. Nos.: 1,993,605; 2,736,238; 2,830,712; 2,860,763; 3,315,541; 3,354,782; 3,587,816; 3,590,982; and 3,958,685.

SUMMARY OF THE INVENTION

An object of the present invention is to provide improved apparatus and a method for burnishing gears incorporating a pair of spaced gear racks having opposed forming faces that mesh with a toothed gear to be burnished during driven rack movement so that the meshing of the rack and gear teeth provides the sole support for the gear as the rack teeth concomitantly burnish the gear teeth.

In carrying out the above object, the gear burnishing apparatus includes a loader for positioning the toothed gear to be burnished between the gear racks so that a drive mechanism which moves the racks in opposite directions relative to each other above and below the gear meshes the rack teeth with the gear teeth to support the gear and burnish its teeth. A delivery guide receives the burnished gears from the gear racks after the burnishing operation and delivers the gears to a location remote from the racks.

Preferably, the gear loader is located on one lateral side of the upper and lower gear racks and the delivery guide is located on the opposite lateral side of the racks. A base of the loader includes a ramp onto which gears to be burnished are fed and also includes spaced supports onto which the gears roll from the ramp so as to orient the gears. A carriage supported on the loader base for lateral movement relative to the racks and driven by a carriage cylinder mounts a gripper mechanism that picks the gears up from the spaced supports and moves the gears to between the gear racks ready for meshing engagement upon driving of the racks by the drive mechanism. Grippers of the gripper mechanism are moved between gripping and nongripping positions by a toggle linkage actuated by a toggle linkage cylinder. Pushers on the grippers provide a means for pushing the burnished gears from between the racks to the delivery guide. This pushing of the burnished gears to the delivery guide takes place as the loader carriage is driven to move the gripper mechanism and load another gear to be burnished between the gear racks.

A conveyor of the apparatus automatically feeds gears to be burnished to the ramp of the loader for rolling down the ramp to the spaced supports of the loader. The conveyor includes a base that supports a pair of spaced sprockets over which a continuous chain is trained with gear carriers on the chain for carrying the gears to the loader ramp. A tensioner of the conveyor adjustably positions one of the sprockets on the conveyor base so as to properly tension the chain. A pivotal indexing arm and a cylinder extending between the base and the arm drive the other sprocket through a one-way clutch in order to move the chain on the sprockets and convey the gears supported by the carriers. Each gear carrier has a pair of spaced supports on which the gears are received during conveyance between spaced side walls of the carrier.

As the conveyor feeds the gears to the loader, the loader carriage is driven toward and away from the racks by its cylinder in order to move the gripper mechanism that positions the gears between the racks as well as pushing the burnished gears from between the racks to the delivery guide. Spaced sensors on the loader base sense the opposite extremes of the carriage movement to control the flow of control fluid to the carriage cylinder and provide reversal of its direction of driving as each extreme is reached. Likewise, spaced sensors supported on the carriage sense the actuating movement of the toggle linkage that positions the grippers of the gripper mechanism in either their gripping or nongripping positions. This sensing of the toggle linkage movement is coordinated with the sensing of the carriage movement so that the grippers are moved to the gripping position to pick a gear from the spaced supports and are moved to the nongripping position after carriage movement has positioned the gear between the gear racks. While the grippers are in the gripping position, the pushers thereon push a burnished gear between the racks to the delivery guide as the carriage is moved toward the racks to position another gear therebetween ready for meshing therewith to provide burnishing of its teeth. Movement of the grippers to the nongripping position allows the pushers to clear the gear positioned between the racks as the carriage is moved away from the racks to permit burnishing of the loaded gear and to ready the gripper mechanism for loading another gear.

The delivery guide of the apparatus includes a movable elongated guide member mounted for movement with the lower gear rack and a pusher mounted for movement with the upper gear rack. One end of the movable guide member receives the burnished gears as the pushers of the gripper mechanism push the gears from between the gear racks. The pusher on the upper gear rack then pushes the burnished gears along the movable guide member of the lower gear rack as the gear racks are driven to mesh with a gear positioned therebetween to burnish the teeth of the gear. A stationary guide member supports a second end of the movable guide member and receives burnished gears therefrom during the reciprocal driving of the gear racks. A roller of the second guide member end provides rolling support thereof along the stationary guide member and a downwardly inclined ramp of the movable guide member adjacent the roller feeds the gears to the stationary guide member. Both the movable and stationary guide members have channel shapes with lower bases and upwardly projecting side walls.

The objects, features and advantages of the present invention are readily apparent from the following detailed description of the preferred embodiment taken in connection with the accompanying drawings.

BRIEF DESCRIPTION OF THE DRAWINGS

FIGS. 9a and 9b cooperatively provide an elevation view of the gear racks of the burnishing machine shown in FIG. 7 as well as showing the delivery guide of the machine; and FIG. 10 is a top plan view of the lower gear rack and the delivery guide taken along line 10—10 of FIGS. 9a and 9b.

DETAILED DESCRIPTION OF THE PREFERRED EMBODIMENT

Figure 1A:
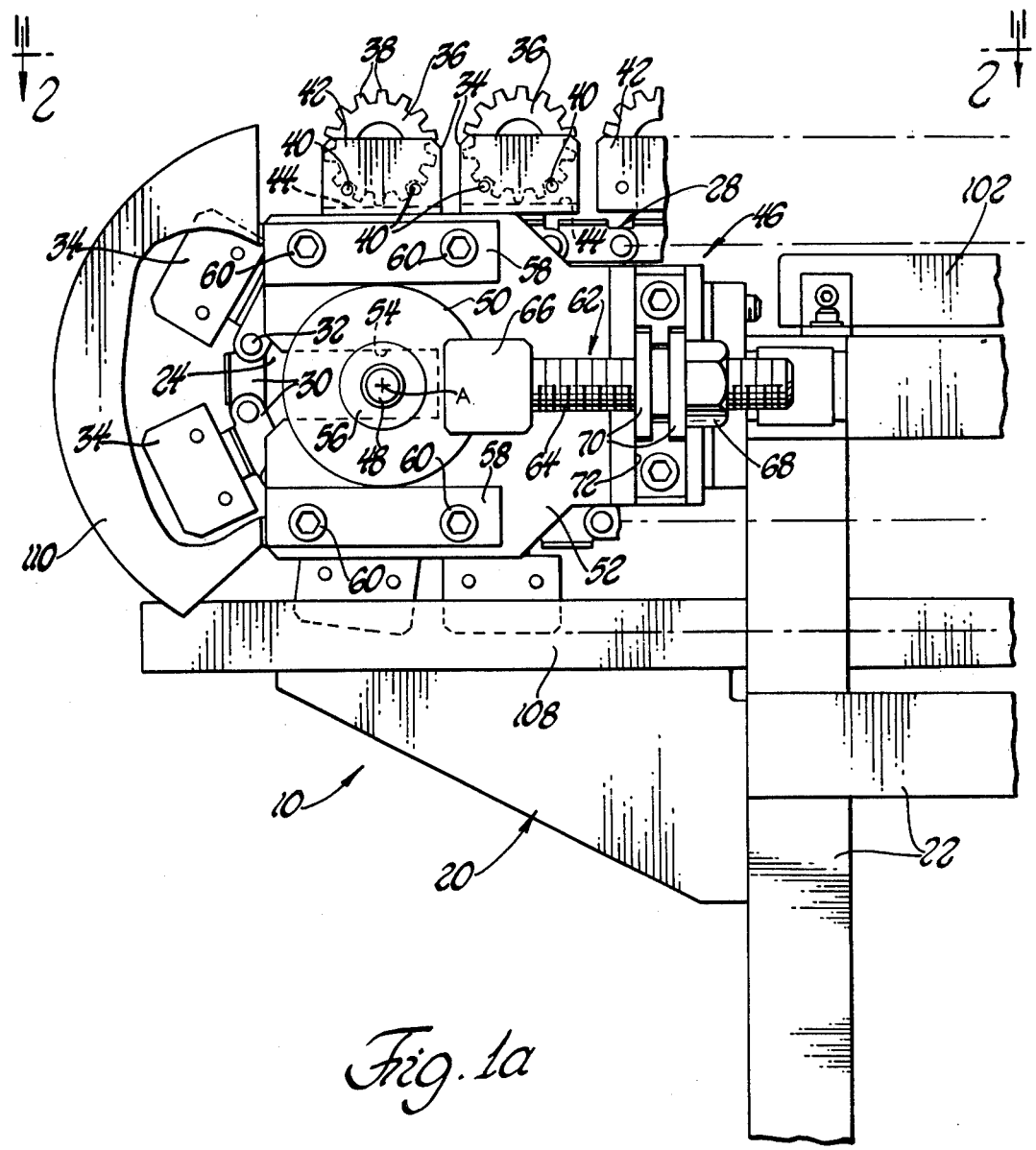
FIGS. 1a and 1b cooperatively provide a side elevation view showing a gear conveyor of gear burnishing apparatus constructed according to the present invention.
Figure 1B:
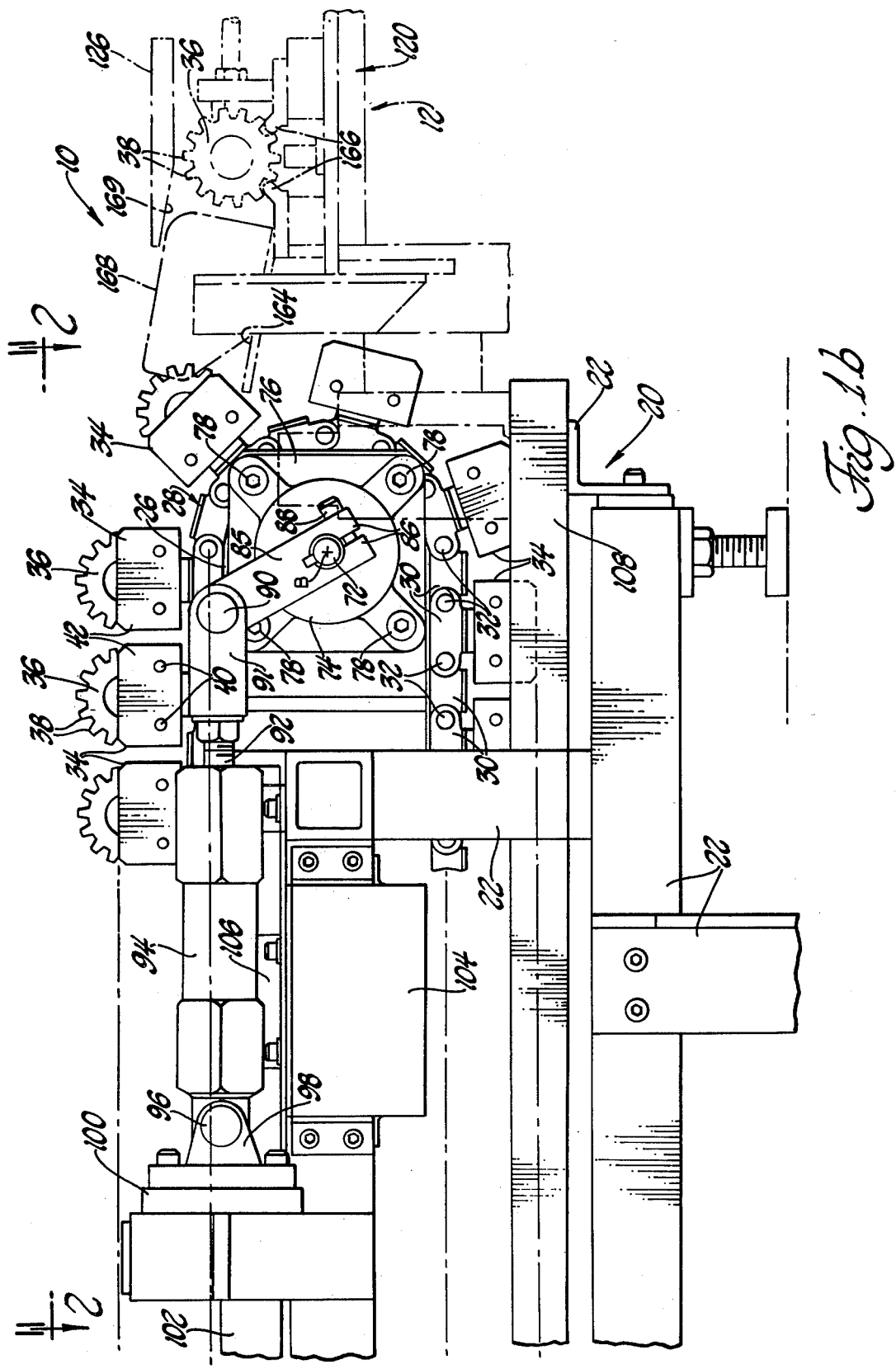
Figure 2:
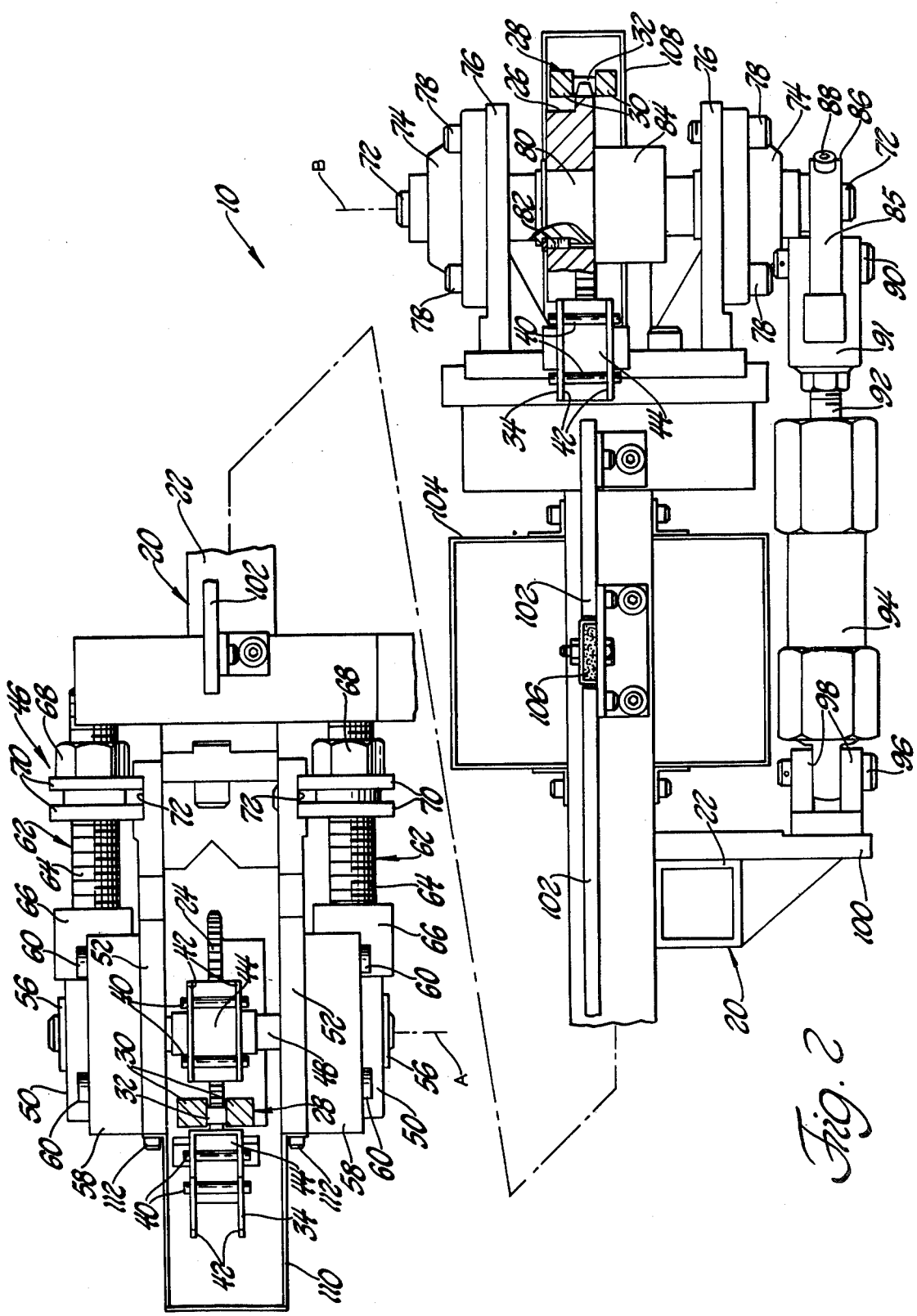
FIG. 2 is a top plan view of the gear conveyor taken along line 2—2 of FIGS. 1a and 1b.

Apparatus for burnishing toothed gears is illustrated in the drawings and includes a conveyor 10 shown in FIGS. 1a, 1b, and 2, a loader 12 shown in FIGS. 3–6, and a burnishing machine 14 having a delivery guide 16 and a drive mechanism 18 all of which are shown by various views of FIGS. 7, 8, 9a, 9b, and 10. Gears to be burnished are fed from the conveyor 10 to the loader 12 for loading and burnishing by the machine 14 prior to delivery to the guide 16 in a manner that is more fully hereinafter described.

With reference to FIGS. 1a, 1b and 2, conveyor 10 includes a base 20 of various frame members 22 of angle sections, square tubular sections, and plate-like shapes. A pair of toothed chain sprockets 24 and 26 best seen in FIG. 2 are mounted in spaced relationship to each other on the conveyor base 20 for rotational movement about respective axes A and B. A continuous chain 28 best seen in FIGS. 1a and 1b is trained over the sprockets 24 and 26 and includes links 30 pivotally interconnected with each other by pins 32. Every other chain link 30 includes a gear carrier 34 so that the chain can convey toothed gears 36 to be burnished as the chain is moved by rotation of the sprockets. Teeth 38 of the gears receive spaced supports 40 of the gear carriers as best shown in FIG. 1a so as to be supported thereby during conveyance by the conveyor. Gear supports 40 extend laterally between side walls 42 of the gear conveyors 34 and these side walls extend from a carrier base 44 that is suitably secured to the associated chain link 30.

A chain tensioner 46 shown in FIGS. 1a and 2 adjustably locates the chain sprocket 24 on the conveyor base 20 so that its axis of rotation A can be moved to the right or the left as required to properly tension the chain 28. A shaft 48 on which the sprocket 24 is fixed extends laterally with respect to the direction of conveyance between a pair of movable bearing supports 50 shown in FIG. 2. A pair of spaced plates 52 of the conveyor base 20 have the sprockets 24 received therebetween (FIG. 2) and define respective open ended slots 54 (FIG. 1a) through which the ends of the shaft 48 extend outwardly to be supported by bearings 56 of the bearing supports 50. A pair of upper and lower slide blocks 58 secured to the outer side of each plate 52 by bolts 60 slidably support the associated bearing support 50 for movement to the left and to the right to permit the adjustment of the chain tension. A screw adjuster 62 of the tensioner moves each bearing support 50 to provide this adjustment. Each adjuster 62 includes a screw 64 having a left-hand end fixed to a fitting 66 which is fixedly secured to the associated bearing support 50. The right-hand end of each screw 64 extends through an associated nut 68 that has a pair of annular collar flanges 70. An outwardly opening slot 72 in each plate 52 receives the periphery of the flanges 70 so that the nuts 68 are fixed against movement to the right or the left as viewed in both FIGS. 1a and 2. Consequently, rotation of nuts 68 moves the screws 64 to the right or the left to move the bearing supports 50 and thereby adjust the axis of rotation A of sprocket 24 in a manner that controls the tension of chain 28.

As seen by combined reference to FIGS. 1b and 2, the other chain sprocket 26 is rotatably supported about the axis B by a shaft 72. Opposite ends of the shaft 72 are rotatably supported by a pair of bearings 74 respectively secured to a pair of spaced plates 76 of the conveyor base 20 by cap screws 78. Between the plates 76 as shown in FIG. 2, a sleeve 80 is rotatable on the shaft 72 and is rotatably fixed to the sprocket 26 by a key 82. A conventional one-way clutch 84 also located between the plates 76 drives the sleeve 80 and hence the sprocket 26 in response to clockwise rotation of shaft 72 as viewed in the direction of FIG. 1b. Shaft rotation in the counterclockwise direction causes the clutch to freewheel. An indexing arm 85 has a lower bifurcated end including tines 86 that are clamped onto the shaft 72 by a screw 88 that extends between the tines. A pin 90 pivotally connects the other end of indexing arm 85 to a yoke 91 on a piston connecting rod 92 of a cylinder 94. Another pin 96 pivotally secures the cylinder 94 to spaced projections 98 on a plate 100 of the conveyor base.

During operation of the conveyor 10, the cylinder 94 shown in FIGS. 1b and 2 is supplied with a suitable pressurized fluid so that a piston connected to the rod 92 within the cylinder is driven to the left and to the right in order to pivot the indexing arm 85 about the axis B. Clockwise pivoting of the indexing arm 85 as viewed in FIG. 1b drives the chain sprocket 26 through the one-way clutch 84 (FIG. 2) in a clockwise direction and moves the chain about this sprocket and the other sprocket 24 so that the carriers 34 convey the gears 36 toward the phantom line indicated gear loader 12. This clockwise driving takes place as the piston connecting rod 92 is being extending from the cylinder 94. During retraction of the piston connecting rod 92, the indexing arm 85 pivoted in a counterclockwise direction and the one-way clutch 84 shown in FIG. 2 then free-wheels so that the gear carriers 34 remain stationary awaiting another extending stroke of the cylinder for conveyance. The supply of the control fluid to the cylinder 94 is coordinated with the operation of the loader 12 so that gears 36 are supplied thereto at the required rate.

During operation of the conveyor 10, an elongated rail 102 supports the upper reach of the chain 28 along which the gears 36 are conveyed by the carriers 34. Intermediate the ends of rail 102, an oil reservoir 104 provides lubrication of the chain 28 by way of an upwardly extending wick 106 (FIG. 2). During passage between the sprockets 24 and 26 along a lower reach of the chain 28, the gear carriers 34 move along an elongated shield 108 from the right to the left. At the left-hand sprocket 24, the carriers 34 move upwardly through an end cover 110 that is secured to the spaced plates 52 of the conveyor base by screws 112 shown in FIG. 2. A suitable feeder may be utilized to supply gears to be burnished to the carriers 34 on the upper reach of the conveyor chain 28 or the gears may be manually loaded on the conveyor by the operator. Since a number of the gears can be loaded at one time, the operator is feed from this loading task for extended periods of time as the gears are being burnished.

Figure 3:
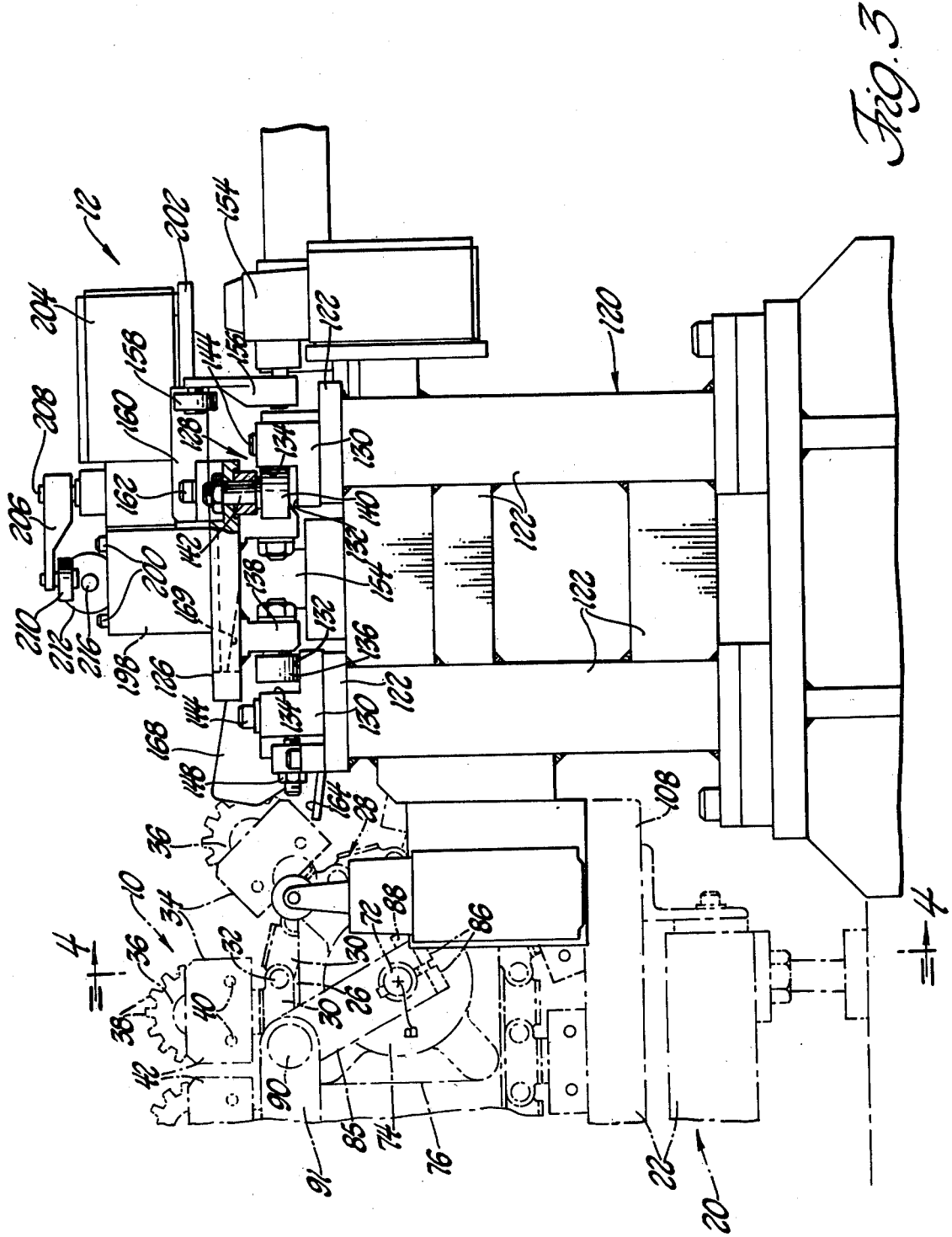
FIG. 3 is an elevation view of a gear loader of the apparatus taken in the same direction as FIGS. 1a and 1b.
Figure 4:
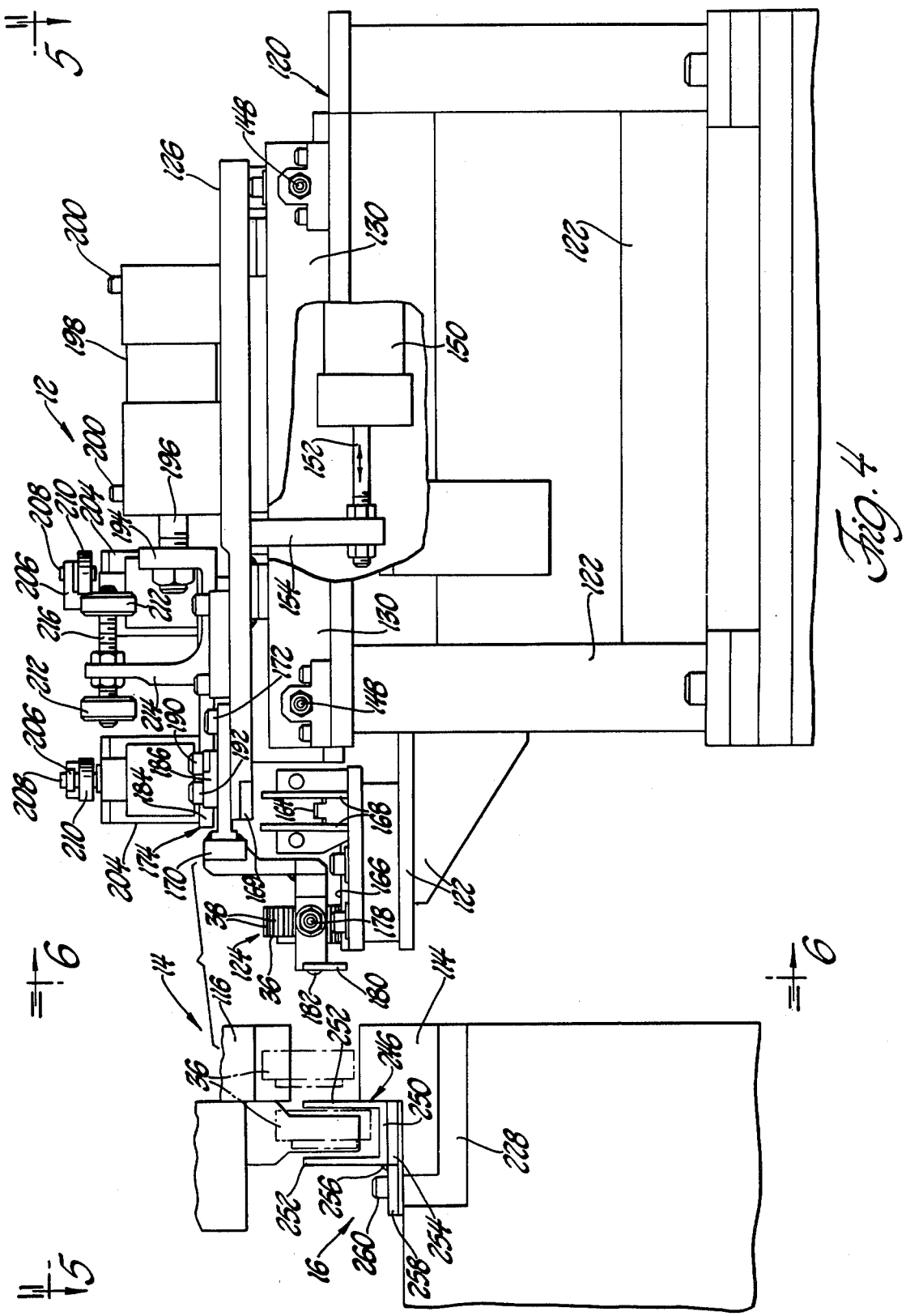
FIG. 4 is an elevation view of the loader taken along line 4—4 of FIG. 3.
Figure 7:
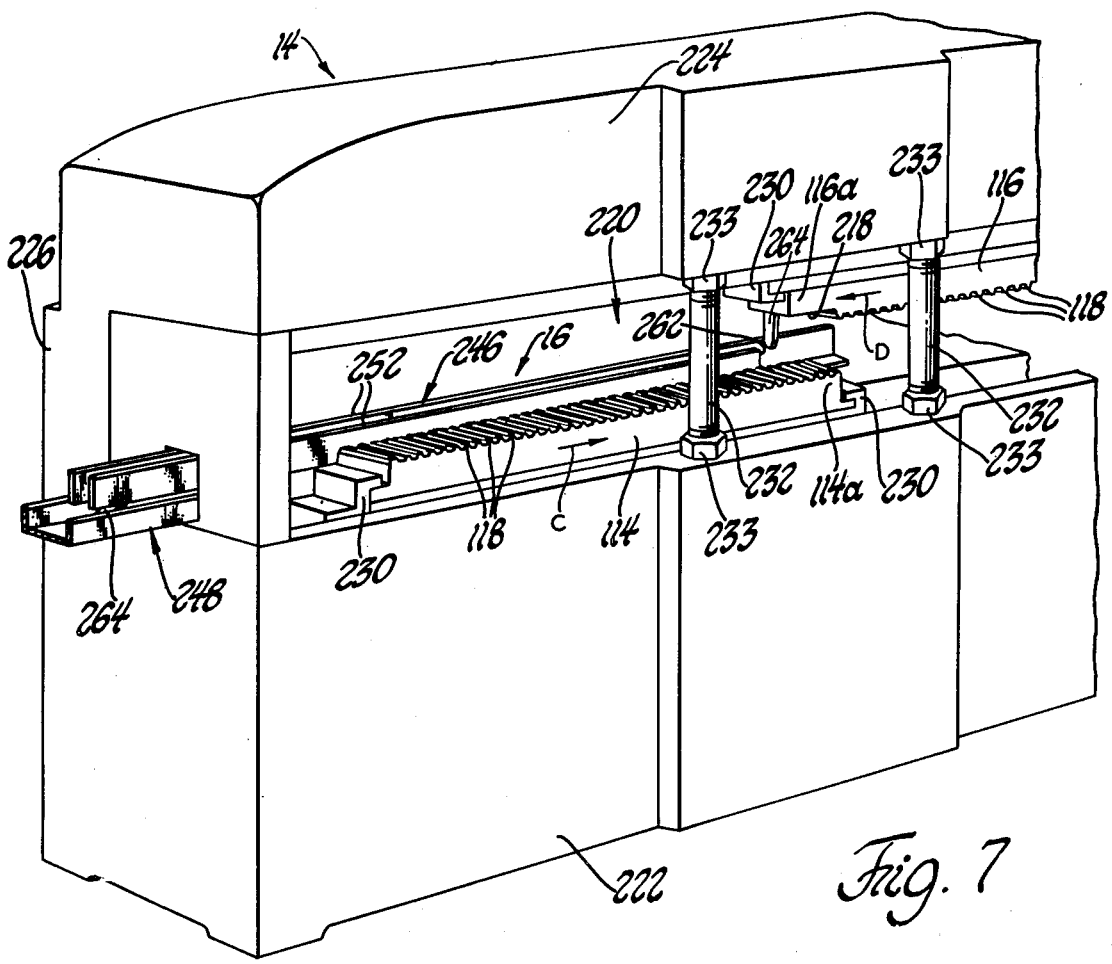
FIG. 7 is a partial perspective view of a burnishing machine which receives gears to be burnished from the conveyor and loader of FIGS. 1a and 1b–6 and which has a delivery guide for receiving and delivering burnished gears from the machine.

Gear loader 12 shown in FIGS. 3–6 receives the gears 36 to be burnished from the conveyor 10 and automatically feeds the gears to the gear burnishing machine 14 shown in FIG. 7 between a lower gear rack 114 and an upper gear rack 116. Opposed forming faces of the gear racks 114 and 116 have teeth 118 disposed therealong for meshing engagement with the gears, as in more fully hereinafter described, as the drive mechanism 18 shown in FIG. 8 reciprocates the racks relative to each other in opposite directions. Gear loader 12 as seen in FIG. 4 is located at one lateral side of the gear racks 114 and 116 while the delivery guide 16 which receives burnished gears from between the racks is located at the opposite lateral side thereof as the loader. A base 120 of the loader includes various vertical legs, rails, cross beams, plates, etc. all of which are indicated by 122 and which cooperate to support a movable gripper mechanism 124. A carriage 126 (FIGS. 3–5) mounts the gripper mechanism 124 and is itself supported on the loader base 120 by a slideway 128 shown in FIG. 3. Spaced slide members 130 of slideway 128 have L-shaped cross sections as shown in FIG. 3 and define upwardly facing horizontal surfaces 132 as well as inwardly facing vertical surfaces 134 that oppose each other. A plurality of rollers 136 (only one shown) are supported on projections 138 that extend downwardly from the carriage 126 so as to rollingly engage the horizontal surfaces 132 on the slide members 130. Likewise, a plurality of rollers 140 (only one shown) are supported by bolts 142 that extend downwardly from the carriage 126 so as to rotate about respective vertical axes in rolling engagement with the vertical surfaces 134 on the slide members 130. The right-hand slide member 130 in FIG. 3 is fixedly mounted on the loader base 120 by bolts 144 while the left-hand slide member 130 is mounted thereon by bolts 144 and has elongated slots 146 (FIG. 5) that permit inward movement of this slide member toward the other slide member. Adjustment of the slide member having the slots 146 thus permits elimination of any slop between the rollers 140 (FIG. 3) and the vertical surfaces 134 these rollers engage. A pair of adjustable stops 148 (FIGS. 3–5) engage the adjustable slide member 130 to prevent movement thereof once it has been adjusted.

Movement of carriage 126 along the slideway is accomplished by a cylinder 150 shown in FIG. 4. The cylinder 150 is fixed to the loader base 120 and has a piston connecting rod 152 secured to a downwardly extending projection 154 on the carriage 126. Hydraulic fluid supplied to the cylinder 150 reciprocates a piston to the left and to the right to extend and retract rod 152 in order to move the carriage 126 laterally with respect to the gear racks 114 and 116 of the burnishing machine 14. A pair of spaced sensors 154 (FIG. 5) sense the opposite extremes of the carriage movement to terminate the supply of the hydraulic fluid to the cylinder 150. Each sensor has a movable sensing arm 156 carrying an associated roller 158 that engages a horizontally extending sensor actuator 160 secured to the carriage by bolts 162. Supply of control fluid to the cylinder 150 is controlled by the sensors 154 in coordination with the supply of a control fluid to the gripper mechanism 124 in a manner that is hereinafter described to coordinate carriage movement with operation of the gripper mechanism.

As best seen in FIGS. 1b and 3, a ramp 164 receives the gears 36 from the conveyor 10 so that the gears roll down the ramp toward a pair of spaced supports 166 on the loader base 120. A pair of side walls 168 guide the gears as they roll down the ramp 164 toward the spaced supports 166 below an inclined recess 169 in the carriage 126. As the gears 36 reach the spaced supports 166, the gear teeth 38 receive the supports therebetween to orient the gears. Supports 166 are removably and adjustably supported in order to accommodate gears of different diameters having teeth of varying sizes.

Figure 5:
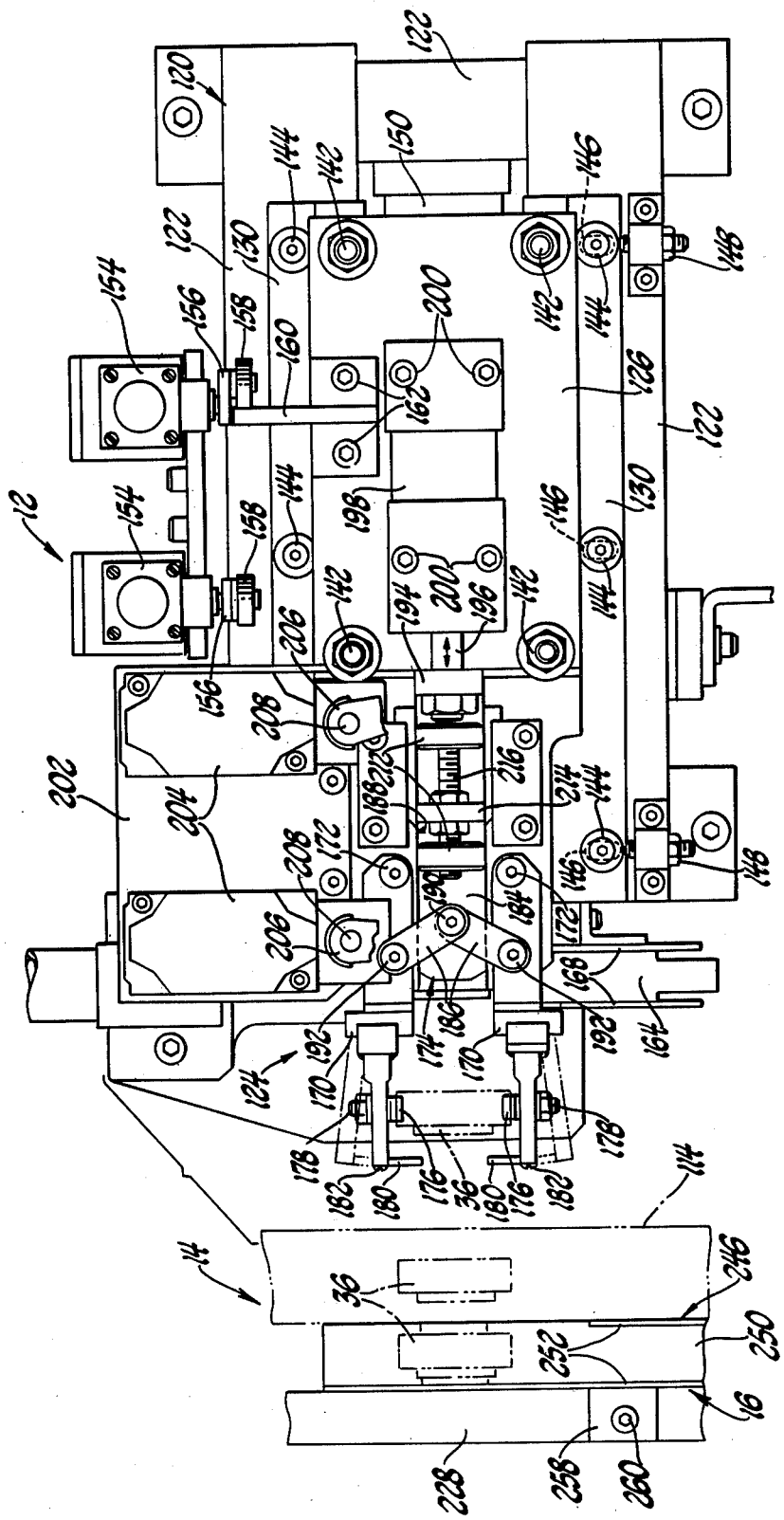
FIG. 5 is a top plan view of the loader taken along line 5—5 of FIG. 4.
Figure 6:
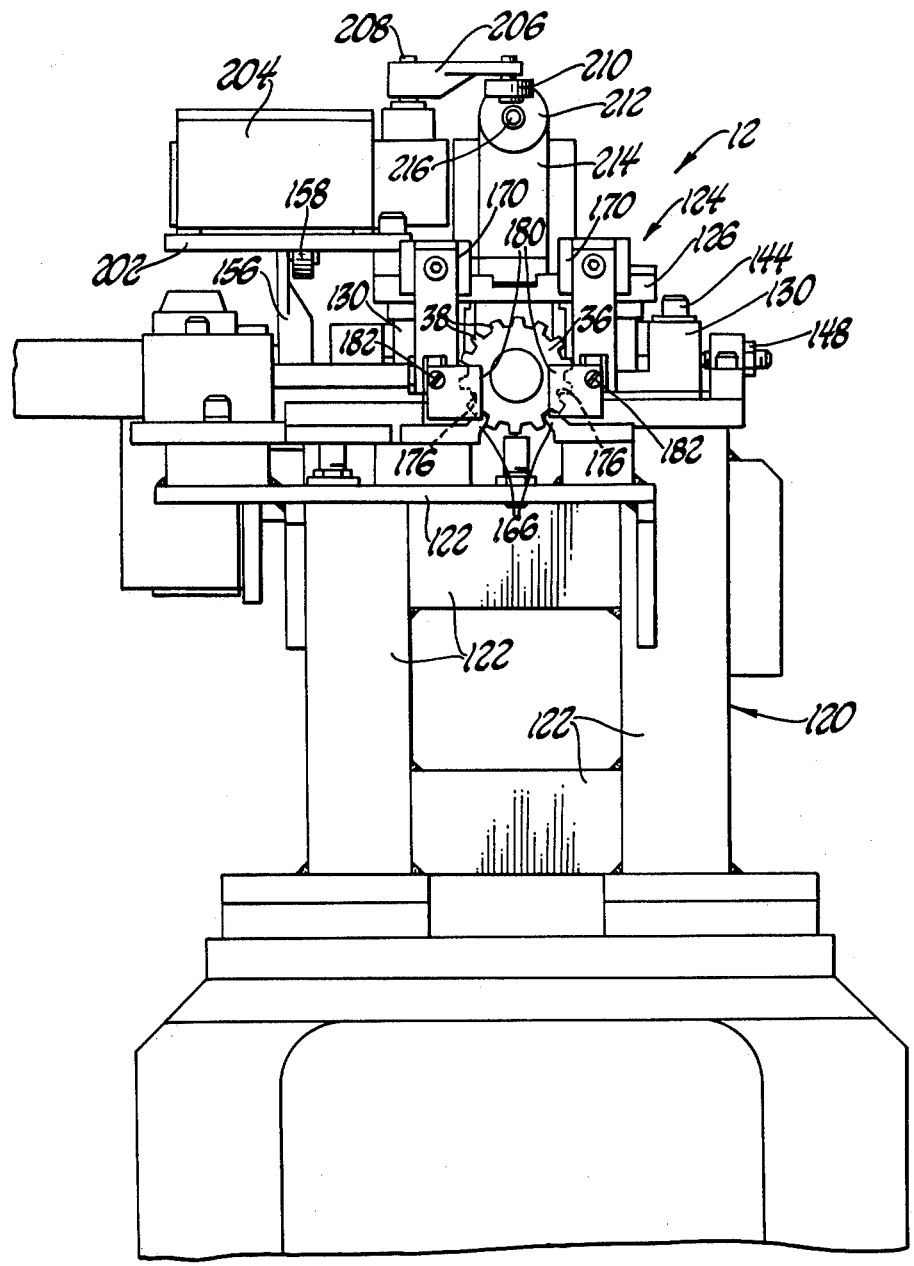
FIG. 6 is an elevation view of the loader taken along line 6—6 of FIG. 4.

Gripper mechanism 124 as shown in FIG. 5 includes a pair of grippers 170 mounted on the carriage 126 about spaced vertical axes by a pair of bolts 172. Movement of the grippers 170 between the gripping position shown by solid line representation and the phantom line indicated nongripping position is achieved by a toggle linkage indicated by 174. With the grippers 170 in the gripping position, teeth 176 secured to the grippers by nut and bolt connections 178 engage the teeth 38 of the gear 36 to support and move the gear toward the gear racks of the burnishing machine 14. During this movement, pushers 180 secured to the grippers 170 by screws 182 engage a gear 36 which has previously been burnished by the machine 14 and push this gear to the delivery guide 16 to make room for the gear being loaded. Toggle linkage 174 is then actuated to move the grippers to the phantom line indicated nongripping position so that the carriage can be moved in a retracting direction with the pushers 180 clearing the gear 36 which has just been loaded.

Toggle linkage 174 which moves the grippers 170 is shown in FIG. 5 as including a slide link 184 and a pair of connecting links 186. Slide link 184 is mounted within a slideway 188 on carriage 126 so as to be movable toward and away from the burnishing machine relative to the carriage. A forward end of the slide link 184 is connected by a bolt 190 to inner ends of connecting links 186. Other ends of the connecting links 186 are respectively pivoted to the grippers 170 by a pair of bolts 192. Slide link 184 has a upwardly extending projection 194 to which a piston connecting rod 196 of a toggle linkage control cylinder 198 is secured. Bolts 200 secure the cylinder 198 to the carriage 126 such that control fluid supplied to opposite sides of a piston within the cylinder extends and retracts the piston connecting rod 196 to move the slide link 184 with respect to the carriage. Outward movement of connecting rod 196 moves the bolt 190 connected to the inner ends of connecting links 186 to the left with respect to the bolts 192 connected to the outer ends of these links so as to straighten the bent shape of the links and to thereby pivot the grippers 170 about the bolts 172 to the outer nongripping position shown by phantom lines. Retracting movement of the connecting rod 196 moves the toggle linkage connecting links 186 back to the bent condition shown so as to pivot the grippers 170 inwardly toward the gripping position with the teeth 176 engaging the teeth of the gear 36.

As seen in FIGS. 4 and 5, a support plate 202 mounted on the carriage 126 supports a pair of spaced sensors 204 that sense the toggle linkage movement in order to control a supply of hydraulic fluid to the control cylinder 198 that moves the linkage. Sensors 204 have respective sensing arms 206 pivotally supported on pins 208 (FIG. 5) and carrying rollers 210 in the manner best seen in FIGS. 3 and 6. Actuating movement of the sensor arms 206 is achieved by a pair of adjustable actuators 212 shown in FIG. 4. An upwardly extending projection 214 on the toggle linkage slide link 184 (FIG. 5) supports a screw 216 on which the actuators 212 are adjustably positioned. As the piston connecting rod 196 of the toggle linkage cylinder 198 reaches its extremes of extending and retracting movement, one of the actuators 212 will engage one of the sensing arm rollers 210 in order to actuate the associated sensor 204 and terminate the supply of control fluid to the cylinder.

A suitable hydraulic control circuit interconnects the operation of the cylinders 150 and 198 shown in FIG. 4 so as to coordinate their operation during loading of gears. Each gear loading cycle begins with the carriage 126 positioned in its rearward position and with the toggle linkage having its grippers 170 in the nongripping position shown by phantom lines in FIG. 5. Linkage cylinder 198 is first actuated to move the grippers 170 to the gripping position shown by solid lines in FIG. 5 so as to grip a gear 36 previously oriented on the supports 166 after rolling down the ramp 164, see FIG. 1b. Subsequently, the carriage cylinder 150 shown in FIG. 4 is supplied with hydraulic fluid to move the carriage forwardly toward the burnishing machine 14 and to position the gear 36 carried by the grippers 170 between the gear racks 114 and 116. As previously mentioned, the pushers 180 on the grippers then push a gear which has already been burnished by the machine 14 from between its gear racks 114 and 116 to the delivery guide 16 during this loading of another gear. Linkage control cylinder 198 is then supplied with hydraulic fluid to extend its piston connecting rod 196 and thereby straightens the linkage so that grippers 170 move to the nongripping position. Carriage cylinder 150 is then supplied with hydraulic fluid to move the carriage 126 rearwardly away from machine 14 as the pushers 180 on the grippers clear the gear which has just been loaded due to the positioning of the grippers in the nongripping position. The loader is then ready for another cycle to load a gear which is supplied by the conveyor 10 described in connection with FIGS. 1a, 1b and 2. Each time control fluid is supplied to the carriage cylinder 150, control fluid is also supplied to the cylinder 94 (FIG. 1b) of the conveyor 10 in order to extend and retract its connecting rod 92 and provide feeding of the gears 36 to the loader in coordination with the loader operation. Also, actuation of the sensors 154 and 204 during this operation provides a means for sequencing the extension of the carriage and toggle linkage cylinders 150 and 198 in order to provide the carriage movement and toggle linkage actuation of the grippers 170 in the manner described.

During loading, each gear is positioned between the leading ends 114a and 116a of the gear racks with the racks located as shown in FIG. 7. Although the gears 36 are oriented for meshing with the teeth 118 of the lower rack 114 due to the spaced supports 166 (FIG. 6), the gears are positioned slightly above the teeth of the lower rack 114 as shown in FIG. 4 during the loading to make sure there is no interference between the gear and the rack. In this connection, the leading end 116a of the upper rack 116 has a relieved surface 218 that precedes its leading teeth. As the gear is released, the gear falls downward so that its teeth mesh with the teeth of the leading end 114a on the lower rack below the relieved surface 218 of the upper rack leading end 116a. Each of the gear racks 114 and 116 is located in a work space 220 of the burnishing machine 114. This work space is defined by a lower floor mounted base position 222, an upper base portion 224, and a connecting portion 226 from which both base portions 222 and 224 project forwardly.

Figure 8:
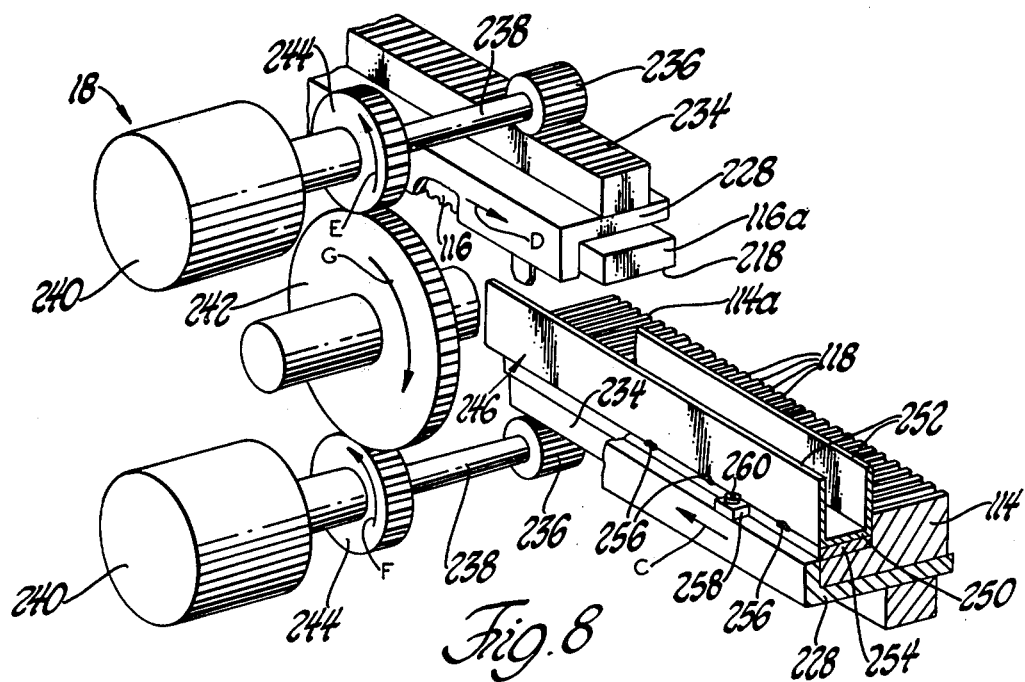
FIG. 8 is a perspective view of a drive mechanism for upper and lower gear racks of the machine shown in FIG. 7.

After each gear is loaded between the leading gear rack ends 114a and 116a, the drive mechanism 18 shown in FIG. 8 is actuated to mesh the teeth of the gear with the rack teeth 118 in order to provide burnishing of the gear teeth. Each gear rack as shown in FIG. 8 is supported by an associated slideway member 228 of an L-shaped cross section. Clamps 230 (FIG. 7) secure the ends of the gear racks 114 and 116 to their associated slideway members 228 (FIG. 8) which are respectively mounted on slideways of the machine base portions 222 and 224 shown in FIG. 7 for movement along the direction of arrows C and D. Adjustable tension members 232 extend between nuts 233 on the base portions 222 and 224 outboard from the gear racks to prevent deflection during the burnishing of the gears by the racks. On the opposite side of each slideway member 228 from its associated gear rack as seen in FIG. 8, drive racks 234 of drive mechanism 18 are meshed with associated pinion drive gears 236 fixed on respective drive shafts 238. Drive shafts 238 are respectively driven by a pair of hydraulic motors 240 in the directions shown by arrows E and F in order to drive the gear racks in the direction of arrows C and D relative to each other. During this driving of the gear racks, an intermediate gear 242 meshes with gears 244 on intermediate portions of the drive shafts 238 in order to ensure coordinated movement of the gear racks with each other. Gear 242 thus rotates in the direction of arrow G as drive shafts 238 are driven in the direction of arrows E and F to drive the racks along the direction of arrows C and D. Hydraulic motors 240 are reversible in order to rotate the drive shafts 238 in the opposite directions from the arrows shown and to thereby reverse the direction of gear rack movement in order to provide reciprocal driving of the racks.

When the drive mechanism 18 drives the gear racks 114 and 116 with a gear 36 loaded therebetween as shown in FIG. 9b, the gear teeth 38 move into a meshing relationship with the rack teeth 118 on both the lower and upper racks 114 and 116. This meshing relationship provides the sole support for the gear 36 as it rotates about its center and has its teeth burnished by the rack teeth which are of a somewhat harder surface hardness. Any knicks, surface roughness, or other defects of the gear teeth 38 are removed by this burnishing to improve the quality of the gears by eliminating noise during use as well as lengthening the average service lifetime of the gears. This burnishing is carried out on both sides of the gear teeth as a result of the reciprocal driving of the gear racks 114 and 116 by the drive mechanism 18 shown in FIG. 8. During the initial movement of gear rack 114 along the direction of arrow C, the gear 36 will be carried slightly toward the right before meshing with the teeth of the upper rack 116 which is moving along the direction of arrow D toward the left. Subsequently, the gear will stay in the same location rotating about a constant axis as the gear teeth mesh with the rack teeth. Upon the reverse driving of the gear racks, the gear likewise stays at the same location until its teeth move out of meshing engagement with the teeth of the upper rack 116 and the gear then moves slightly toward the left as it is carried by the lower rack 114 back to the initial point at which it was loaded.

As previously mentioned in connection with the description of FIG. 4, the pushers 180 on the gripper mechanism 124 push each gear 36 after it is burnished to the delivery guide 16 during the loading of the next gear to be burnished. As seen by combined reference to FIGS. 9a, 9b, and 10, the delivery guide 16 includes a movable guide member 246 as well as a stationary guide member 248. Guide member 246 has an upwardly opening channel shape as seen in FIG. 4 including a lower base 250 and spaced side walls 252 projecting upwardly from the lower base. A lower support plate 254 to which the guide member 246 is secured by spaced welds 256 (see also FIG. 8) has a number of outwardly projecting tabs 258 secured by screws 260 to the slideway member 228 that supports the lower rack 114. Guide member 246 thus reciprocates with the lower rack during reciprocal driving of the racks as the gears are burnished. Adjacent the leading end 114a of the lower gear rack as best seen in FIG. 10, the movable guide member 246 has its side wall 252 closest to the rack teeth 118 provided with an opening 262 through which the gears 36 are pushed onto this guide member. A pusher 264 mounted on the upper gear rack 116 as best shown in FIG. 9b moves between the side walls 252 of the movable guide member 246 as the gear racks are reciprocated relative to each other in order to push burnished gears along this guide member. As seen in FIG. 9a, the movable guide member 246 extends outwardly in a cantilevered manner from the trailing end of the lower gear rack 114 and has an outer end including a downwardly inclined ramp 264 and a roller 266 supported on the stationary guide member 248. Spaced downwardly extending projections 268 of the movable guide member support a pin 270 on which the roller 266 is rotatably mounted so as to provide the support for the movable guide member on the stationary guide member during the burnishing. Stationary guide member 248 also has an upwardly opening channel shape in which the roller 266 is received with a lower base 272 that supports the roller and spaced side walls 274 between which the roller is received. As the gears 36 are moved along the movable guide member by the pusher 264 (FIG. 9b), ramp 264 permits downward rolling of the gears to the stationary guide member 248 for delivery to a location remote from the gear racks such as a storage bin or the like.

While a preferred embodiment of the apparatus and method for burnishing gears has herein been described in detail, those skilled in the art will recognize various alternative designs and embodiments for practicing the present invention as defined by the following claims.

What is claimed is:

1. Apparatus for loading toothed gears to be burnished between a pair of spaced gear racks, the apparatus comprising: a base; a carriage mounted on the base for movement relative thereto; a first cylinder for reciprocating the carriage on the base; a gripper mechanism mounted on the carriage and including movable grippers for positioning the toothed gears between the gear racks for meshing engagement therewith during driven rack movement so that the meshing of the gear and rack teeth provides the sole support for the gears; a toggle linkage for moving the grippers between gripping and nongripping positions; a second cylinder for moving the toggle linkage to move the grippers between the gripping and nongripping positions; and pushers on the grippers for pushing a burnished gear from between the gear racks during loading of another gear to be burnished.

2. Apparatus as in claim 1 further including spaced supports for receiving and orienting gears to be burnished ready to be positioned between the gear racks by the gripper mechanism, and an inclined ramp that feeds gears to be burnished to the spaced supports.

3. Apparatus as in claim 1 further including a conveyor comprising: a base; a pair of spaced sprockets mounted on the base; a continuous chain trained over the sprockets and having gear carriers thereon for carrying gears; a tensioner for adjustably positioning one of the sprockets on the base to provide proper tensioning of the chain; a pivotal indexing arm; a one-way clutch that drives the other sprocket upon pivoting of the arm; and an indexing cylinder extending between the base and the arm to pivot the arm and thereby rotate the sprockets to provide chain movement that conveys gears on the carriers.

4. Apparatus as in claim 3 wherein each carrier includes a carrier base, side walls that extend from the carrier base, and spaced supports extending between the side walls so as to engage the teeth on a gear to provide support thereof.

5. Apparatus as in claim 3 wherein the tensioner includes a pair of screw adjusters.

6. Apparatus as in claim 5 wherein each screw adjuster includes a bearing support and a screw that extends between the associated bearing support and the base of the apparatus.

7. Apparatus for conveying and loading toothed gears to be burnished between a pair of spaced gear racks, the apparatus comprising: a conveyor including a conveyor base, a pair of spaced sprockets mounted on the base, a continuous chain trained over the sprockets and having gear carriers thereon for carrying gears, a tensioner for adjustably positioning one of the sprockets on the conveyor base to provide proper tensioning of the chain, a pivotal indexing arm, a one-way clutch that drives the other sprocket upon pivoting of the arm, and an indexing cylinder extending between the base and the arm to pivot the arm and thereby rotate the sprockets to provide chain movement that conveys gears on the carriers; and a loader including a loader base, an inclined ramp on the loader base for receiving gears from the conveyor, spaced supports on the loader base onto which the gears roll from the inclined ramp so as to orient the gear teeth, a carriage mounted on the loader base for movement generally perpendicular to the direction gears roll along the ramp, a carriage cylinder for moving the carriage relative to the loader base, a gripper mechanism mounted on the carriage and including movable grippers for gripping a toothed gear on the spaced supports and positioning the gear between the spaced gear racks as the carriage is moved on the loader base, a toggle linkage on the carriage for moving the grippers between gripping and nongripping positions, a toggle linkage cylinder on the carriage for actuating the linkage to move the grippers, and pushers on the grippers for pushing burnished gears from between the gear racks as the carriage is moved to position another gear to be burnished between the racks.

* * * * *

UNITED STATES PATENT AND TRADEMARK OFFICE
CERTIFICATE OF CORRECTION

PATENT NO. : 4,189,279

DATED : February 19, 1980

INVENTOR(S) : Marvin R. Anderson

It is certified that error appears in the above-identified patent and that said Letters Patent are hereby corrected as shown below:

Column 5, line 7 after "85" insert --is--.
Column 5, line 31 "feed" should be --freed--.
Column 5, line 39 "in" should be --is--.
Column 6, line 68 "Other" should be --Outer--.
Column 8, line 29 "114" should be --14--.
Column 8, line 30 "position" should be --portion--.

Signed and Sealed this

First Day of July 1980

[SEAL]

Attest:

Attesting Officer

SIDNEY A. DIAMOND

Commissioner of Patents and Trademarks